United States Patent
Chen

(10) Patent No.: US 7,567,190 B2
(45) Date of Patent: Jul. 28, 2009

(54) APPARATUS AND METHOD FOR PROCESSING DATA IN TRANSMITTING AND RECEIVING END OF RFID SYSTEM

(75) Inventor: Chien-Sheng Chen, Hsinchu County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 0 days.

(21) Appl. No.: 11/946,036

(22) Filed: Nov. 27, 2007

(65) Prior Publication Data

US 2009/0134976 A1    May 28, 2009

(51) Int. Cl.
*H03M 9/00* (2006.01)
(52) U.S. Cl. .................. 341/100; 341/155
(58) Field of Classification Search ............ 341/100, 341/101, 155; 375/324, 285, 371
See application file for complete search history.

(56) References Cited

U.S. PATENT DOCUMENTS

| 5,892,794 | A * | 4/1999 | Slegers | 375/219 |
| 6,201,843 | B1 * | 3/2001 | Kingston et al. | 375/350 |
| 7,010,061 | B2 * | 3/2006 | Subramanian | 375/324 |
| 2005/0177855 | A1 * | 8/2005 | Maynard et al. | 725/88 |

* cited by examiner

*Primary Examiner*—Brian Young
(74) *Attorney, Agent, or Firm*—Winston Hsu

(57) ABSTRACT

A data receiving and processing system includes: an RF front-end circuit, for receiving an analog signal and generating received data; a processing unit, coupled to the RF front-end circuit, for performing processing on the received data; and a buffering circuit, coupled between the processing unit and the RF front-end circuit, for buffering the received data; wherein data transmitted between the RF front-end circuit and the buffering circuit is serial data, and data transmitted between the buffering circuit and the processing unit is parallel data.

34 Claims, 4 Drawing Sheets

APPARATUS AND METHOD FOR PROCESSING DATA IN TRANSMITTING AND RECEIVING END OF RFID SYSTEM

BACKGROUND OF THE INVENTION

1. Field of the Invention

The present invention relates to RFID systems, and more particularly relates to data processing in the transmitting and receiving end in RFID systems.

2. Description of the Prior Art

Radio Frequency Identification (RFID) systems are short range communications systems that can operate at a variety of frequencies. High Frequency (HF) RFID systems operate at 13.56 MHz. They are utilized in any situation where a unique identification system is required.

RFID systems operate by reading a radio frequency signal and transferring the information between a processing device (reader) and a transponder, or RF tag. The radio waves are reflected back from the RFID tag into digital information that can then be passed on to computers for data analysis. The RF tags consist of active tags and passive tags. Passive tags in general have data permanently burned into the tag, and utilize the radio frequency from the reader to transmit their signal. Active tags have an on-board battery power for transmitting their data signal over a greater distance.

RFID systems can be software or hardware systems. A conventional software RFID system consists of an RF front-end circuit and an MCU that receives the data from the front-end circuit, samples the data and processes it. The RF front-end circuit has a one-bit transmitting rate, meaning the MCU also needs to sample and process the data at a one-bit rate. This results in an expensive MCU with limited processing speeds.

A conventional hardware RFID system needs to incorporate hardware that supports all formats of RFID data. This also results in high costs.

SUMMARY OF THE INVENTION

It is therefore an objective of the present invention to provide an HF RFID system that has a more efficient MCU.

With this in mind, a data receiving and processing system is provided, comprising: an RF front-end circuit, for receiving an analog signal and generating received data; a processing unit, coupled to the RF front-end circuit, for performing processing on the received data; and a buffering circuit, coupled between the processing unit and the RF front-end circuit, for buffering the received data; wherein data transmitted between the RF front-end circuit and the buffering circuit is serial data, and data transmitted between the buffering circuit and the processing unit is parallel data.

The present invention also provides a data transmitting and processing system, comprising: a processing unit, for performing processing on data to generate processed data; an RF front-end circuit, coupled to the processing unit, for transmitting the processed data; and a buffering circuit, coupled between the processing unit and the RF front-end circuit, for buffering the processed data; wherein data transmitted between the RF front-end circuit and the buffering circuit is serial data, and data transmitted between the buffering circuit and the processing unit is parallel data.

A method of receiving and processing data in a data receiving and processing system is also provided. The method comprises: receiving a stream of serial data; providing a buffering circuit; storing the stream of serial data in the buffering circuit; providing a processing unit; and outputting data in the buffering circuit to the processing unit in a form of parallel data.

A method of transmitting and processing data in a data transmitting and processing system is further provided. The method comprises: providing a processing unit; providing a buffering circuit; transmitting parallel data from the processing unit to the buffering circuit; storing the parallel data in the buffering circuit; and transmitting the data from the buffering circuit in a form of serial data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
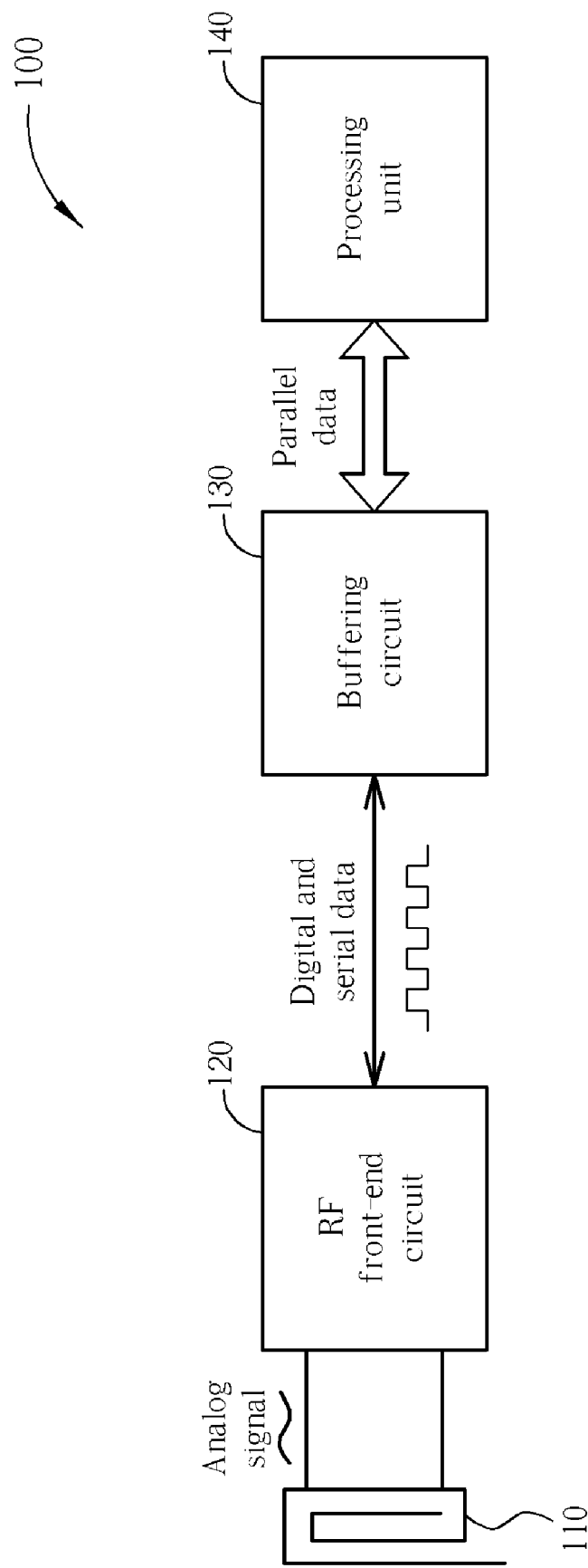
FIG. 1 is a diagram of an RFID system according to a first embodiment of the present invention.

Please refer to FIG. 1. FIG. 1 is a diagram of an RFID system 100 according to a first embodiment of the present invention. The RFID system 100 comprises an RF front-end circuit 120 that receives an analog signal from an antenna 110, a buffering circuit 130, and a processing unit 140. The processing unit 140 can be an MCU (micro control unit). The analog signal received from the antenna 110 is converted by the RF front-end circuit 120 into digital and serial data. The RF front-end circuit still has a one-bit processing rate, as in the prior art. When the buffering circuit 130 receives the digital and serial data, it will buffer the digital and serial data and then transmit the buffered data to the processing unit 140 as parallel data. This enables the processing unit 140 to have a slower access rate than in conventional circuits.

The apparatus shown in FIG. 1 also enables data to be transmitted more efficiently. The processing unit 140 can perform processing on and transmit parallel data to the buffering circuit 130, while the RF front-end circuit 120 accesses the buffering circuit 130 at a one-bit data rate, i.e. the data is transmitted from the buffering circuit 130 to the RF front-end circuit 120 in serial form. The presence of the buffering circuit 130 enables the processing unit 140 to have a lower access rate than the RF front-end circuit 120.

Figure 2:
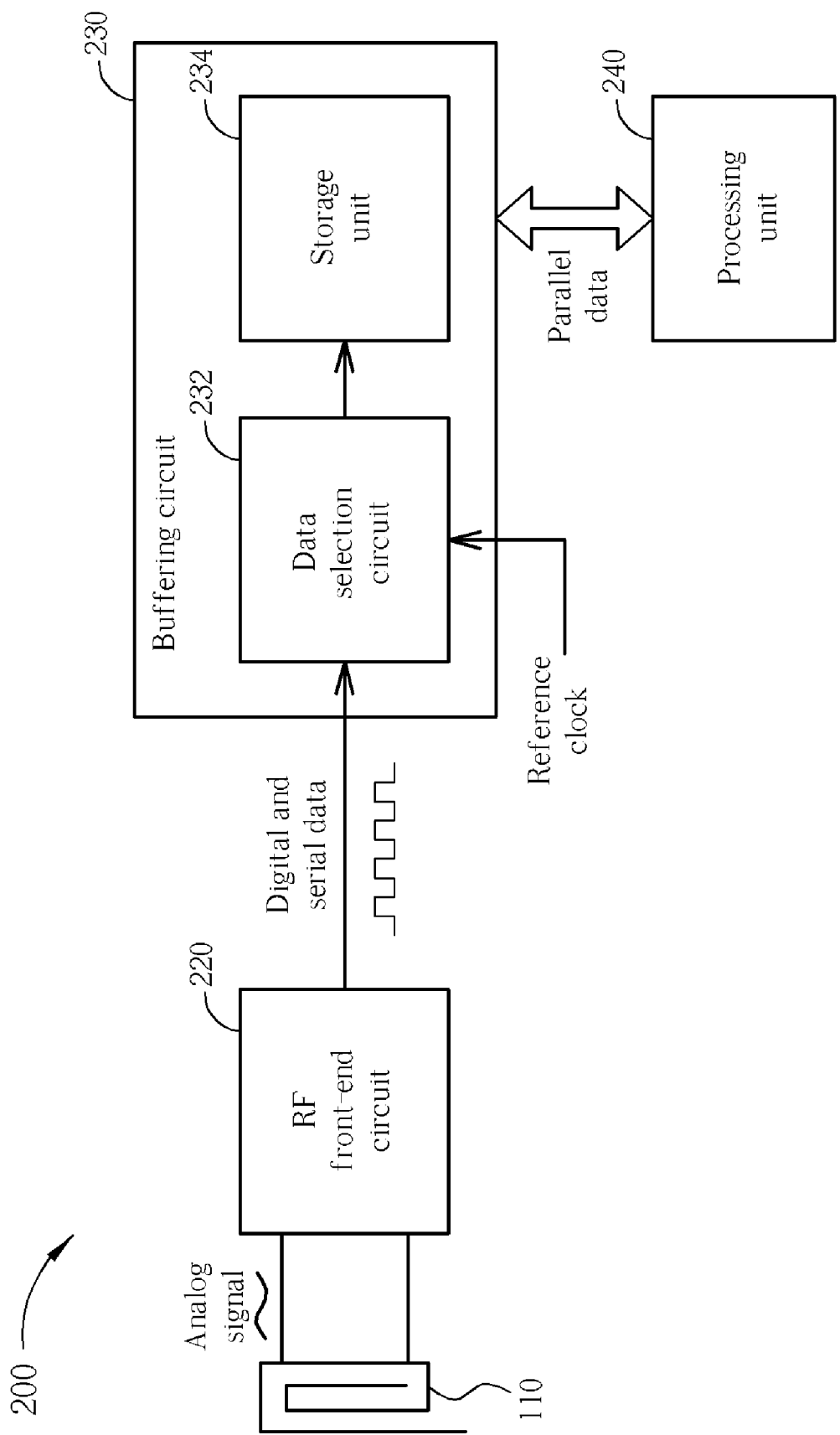
FIG. 2 is a diagram of an RFID system according to a second embodiment of the present invention.

In order to save storage space in the buffering circuit 130, the digital and serial data will be selected before being stored in the storage unit of the buffering circuit 130; therefore the buffering circuit 130 includes a data selection circuit to perform data selection. Please refer to FIG. 2, which is a diagram of an RFID system 200 according to a second embodiment of the present invention. Components performing the same operation as in FIG. 1 will not be detailed again for brevity. As shown in the diagram, the buffering circuit 230 also includes a storage unit 234 and a data selection circuit 232, which receives digital and serial data from the RF front-end circuit 220, and also receives a reference clock. Data is selected according to the reference clock, and input to the storage unit 234. The reference clock may be equal to the operating frequency of the RFID system; for example, if the RFID system is an HF (high frequency) RFID system, the reference clock would be 13.56 MHz. Alternatively, the reference clock may be a fraction of the operating frequency; for example, the system may further include a divider (not shown) for dividing the operating frequency by a number to generate the reference clock. The selected data will then be stored in the storage unit 234. Therefore, not all the digital and serial data will be stored; instead only a part of the data will be stored so the storage unit 234 requires a smaller storage capacity.

Figure 3:
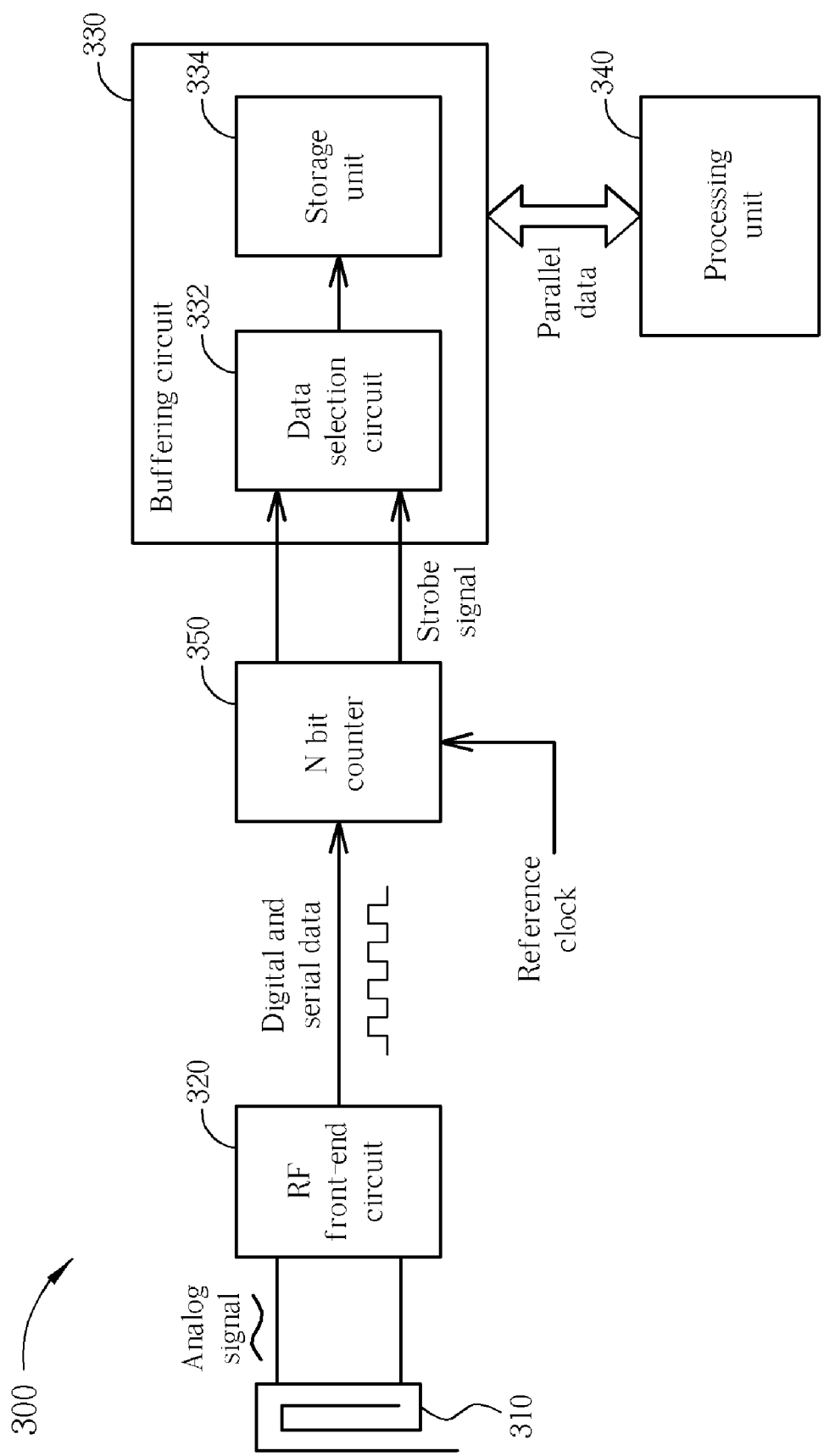
FIG. 3 is a diagram of an RFID system according to a third embodiment of the present invention.

Problems with data selection can arise if the data signal from the RF front-end is unstable due to poor duty cycle. In such a case, a strobe signal can be generated in order to provide a stable signal for data selection. Please refer to FIG. 3. FIG. 3 is a diagram of an RFID system 300 according to a third embodiment of the present invention. The RFID system 300 includes an N bit counter 350, which receives the digital and serial data from the RF front-end 320, and also receives the reference clock, where N is an integer. Again, the reference clock can be identical to the operating frequency of the RFID system 300 or a fraction of the operating frequency. In a poor duty cycle, the received signal may only occupy a part of a normal square wave signal, so the N bit counter will detect the digital and serial data, and produce a strobe signal accordingly. In other words, the N bit counter will recognize the beginning of the digital and serial data and can also generate a strobe signal by detecting the digital and serial data. Then, when the strobe signal is input to the data selection circuit 332, the data selection circuit 332 can accurately select the digital and serial data.

Figure 4:
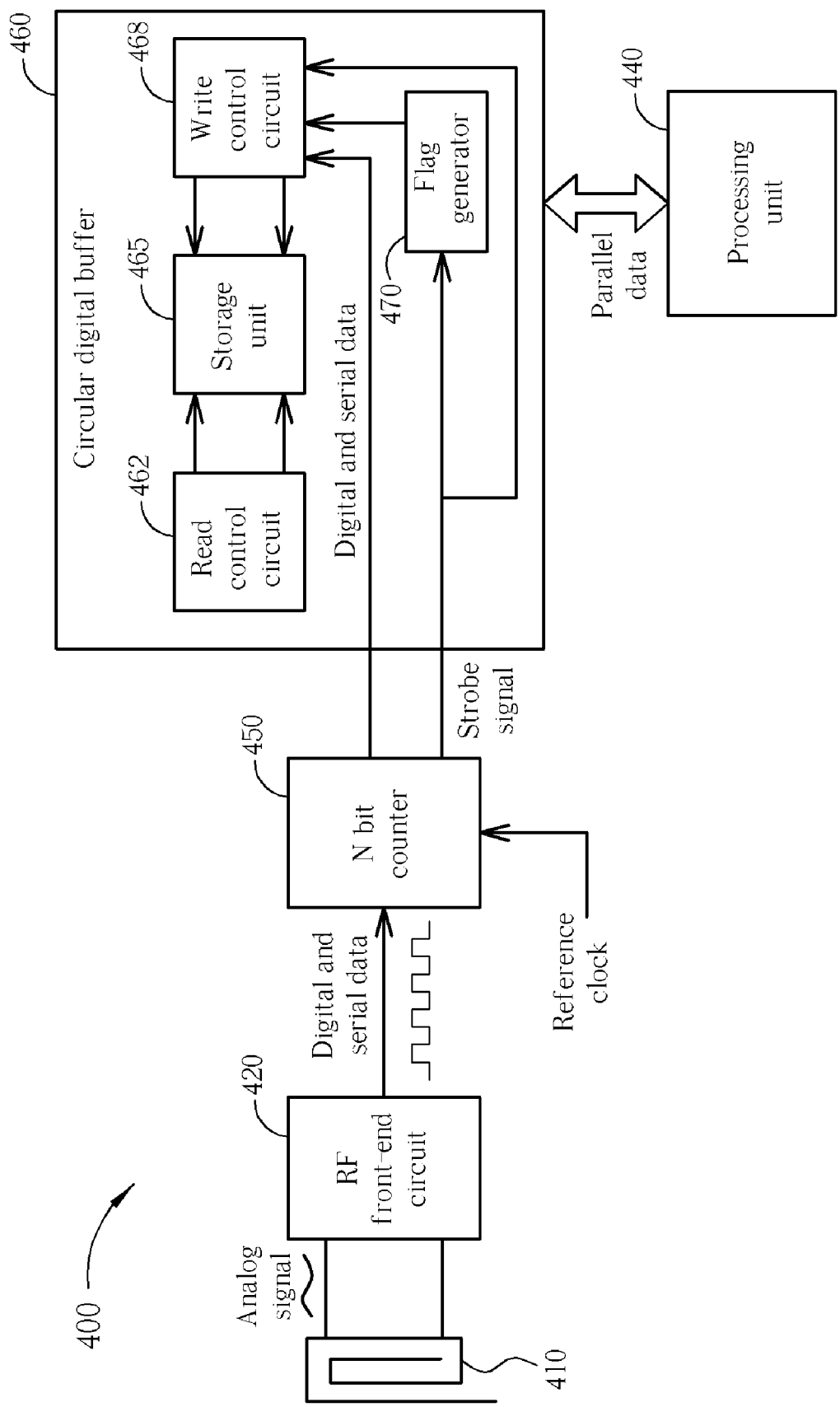
FIG. 4 is a diagram of an RFID system according to a fourth embodiment of the present invention.

In some embodiments the buffering circuit can be a circular digital buffer. Please refer to FIG. 4. FIG. 4 is a diagram of an RFID system 400 according to a fourth embodiment of the present invention. The RFID system 400 includes a circular digital buffer 460, comprising a storage unit 465, a read control circuit 462 and write control circuit 468 for respectively reading from and writing to the storage unit 465, and a flag generator 470.

The flag generator 470 receives the strobe signal from the N bit counter 450 and sets a flag accordingly. As the buffer 460 is a circular buffer, data must not be written to the buffer before old data has been read and passed to the processing unit 440. Initially, before the strobe signal is generated, the flag is not set and an initial write address of the write control circuit 468 is identical to an initial read address of the read control circuit 462. Under this situation, when the N bit counter 450 starts to send the digital and serial data and the strobe signal to the write control circuit 468, the write control circuit 468 starts to write data into the storage unit at the initial write address which is identical to the initial read address, and meanwhile, the flag generator 470 sets the flag. Once the flag is set, the write control circuit 468 will not write data into the storage unit 465 when the write address is again identical to the read address, preventing the unread data from being overwritten by the new coming data. In other words, when the flag generator 470 sets the flag in response to the strobe signal, a write address of the write control circuit 468 will not be ahead of a read address of the read control circuit 462, as this would mean that data is overwritten after it has been sent to the processing unit 440. The flag generator 470 can be implemented by a D flip-flop.

It should be noted that the above embodiments are merely examples of the present invention, and any RFID system that utilizes a buffering circuit to enable an MCU to have a slower access rate than an RF front-end circuit falls within the scope of the present invention. Those skilled in the pertinent art should be able to modify the teachings to achieve the same goals.

It should further be noted that the present invention supports processing units of various bit rates, for example 8-bit, 16-bit and 32-bit processing units can all be utilized in the present invention. Furthermore, this design can support all kinds of RFID systems, which may utilize various kinds of coding and decoding methods such as NRZ (non-return-to-zero), Manchester, Manchester with sub-carrier, Unipolar RZ (return-to-zero), DBP (differential bi-phase), Miller, Modified Miller, Differential coding etc.

By providing a buffering circuit between an RF front-end and a processing unit, the present invention provides an efficient RFID system that can reduce the expense associated with processing units in conventional circuits.

Those skilled in the art will readily observe that numerous modifications and alterations of the device and method may be made while retaining the teachings of the invention.

What is claimed is:

1. A data receiving and processing system, comprising:
an RF front-end circuit, for receiving an analog signal and generating received data;
a processing unit, coupled to the RF front-end circuit, for performing processing on the received data; and
a buffering circuit, coupled between the processing unit and the RF front-end circuit, for buffering the received data, comprising:
a data selection circuit, for selecting the received data according to a reference clock to generate selected data; and
a storage unit, coupled to the data selection circuit, for storing the selected data;
wherein data transmitted between the RF front-end circuit and the buffering circuit is serial data, and data transmitted between the buffering circuit and the processing unit is parallel data.

2. The data receiving and processing system of claim 1, further comprising:
a strobe signal generator, coupled between the RF front-end circuit and the buffering circuit, for generating a strobe signal according to the received data and a reference clock.

3. The data receiving and processing system of claim 2, wherein the strobe signal generator comprises:
an N bit counter, for generating the strobe signal according to the received data and the reference clock.

4. The data receiving and processing system of claim 2, wherein the buffering circuit is a circular digital buffer comprising:
a storage unit;
a flag generator, coupled to receive the strobe signal, for setting a flag when the strobe signal is generated;
a write control circuit, coupled to the storage unit and the flag generator, for receiving the received data and the strobe signal, and for generating a write address and selecting the received data to write into the storage unit according the setting of the flag and the strobe signal; and
a read control circuit, coupled to the storage unit, for generating a read address;
wherein after the flag is set, the received data will not be written into the storage unit when the write address is equivalent to the read address.

5. The data receiving and processing system of claim 1 wherein a bit rate of the processing unit is 8-bits, 16-bits or 32-bits.

6. The data receiving and processing system of claim 1 being an RFID data receiving and processing system.

7. A data receiving and processing system, comprising:
an RF front-end circuit, for receiving an analog signal and generating received data;
a processing unit, coupled to the RF front-end circuit, for performing processing on the received data;
a buffering circuit, coupled between the processing unit and the RF front-end circuit, for buffering the received data; and
a strobe signal generator, coupled between the RF front-end circuit and the buffering circuit, for generating a strobe signal according to the received data and a reference clock;

wherein data transmitted between the RF front-end circuit and the buffering circuit is serial data, and data transmitted between the buffering circuit and the processing unit is parallel data.

8. The data receiving and processing system of claim 7, wherein the strobe signal generator comprises:
an N bit counter, for generating the strobe signal according to the received data and the reference clock.

9. The data receiving and processing system of claim 7, wherein the buffering circuit is a circular digital buffer comprising:
a storage unit;
a flag generator, coupled to receive the strobe signal, for setting a flag when the strobe signal is generated;
a write control circuit, coupled to the storage unit and the flag generator, for receiving the received data and the strobe signal, and for generating a write address and selecting the received data to write into the storage unit according the setting of the flag and the strobe signal; and
a read control circuit, coupled to the storage unit, for generating a read address;
wherein after the flag is set, the received data will not be written into the storage unit when the write address is equivalent to the read address.

10. The data receiving and processing system of claim 7 wherein a bit rate of the processing unit is 8-bits, 16-bits or 32-bits.

11. The data receiving and processing system of claim 7 being an RFID data receiving and processing system.

12. An RFID data receiving and processing system, comprising:
an RF front-end circuit, for receiving an analog signal and generating received data;
a processing unit, coupled to the RF front-end circuit, for performing processing on the received data; and
a buffering circuit, coupled between the processing unit and the RF front-end circuit, for buffering the received data;
wherein data transmitted between the RF front-end circuit and the buffering circuit is serial data, and data transmitted between the buffering circuit and the processing unit is parallel data.

13. The RFID data receiving and processing system of claim 12, further comprising:
a strobe signal generator, coupled between the RF front-end circuit and the buffering circuit, for generating a strobe signal according to the received data and a reference clock;
wherein the buffering circuit comprises
a data selection circuit, for selecting the received data according to the strobe signal to generate selected data; and
a storage unit, coupled to the data selection circuit for storing the selected data.

14. The RFID data receiving and processing system of claim 12, further comprising:
a strobe signal generator, coupled between the RF front-end circuit and the buffering circuit, for generating a strobe signal according to the received data and a reference clock;
wherein the strobe signal generator comprises:
an N bit counter, for generating the strobe signal according to the received data and the reference clock.

15. The RFID data receiving and processing system of claim 12, further comprising:
a strobe signal generator, coupled between the RF front-end circuit and the buffering circuit, for generating a strobe signal according to the received data and a reference clock;
wherein the buffering circuit is a circular digital buffer comprising:
a storage unit;
a flag generator, coupled to receive the strobe signal, for setting a flag when the strobe signal is generated;
a write control circuit, coupled to the storage unit and the flag generator, for receiving the received data and the strobe signal, and for generating a write address and selecting the received data to write into the storage unit according the setting of the flag and the strobe signal; and
a read control circuit, coupled to the storage unit, for generating a read address;
wherein after the flag is set, the received data will not be written into the storage unit when the write address is equivalent to the read address.

16. The RFID data receiving and processing system of claim 12 wherein a bit rate of the processing unit is 8-bits, 16-bits or 32-bits.

17. A data transmitting and processing system, comprising:
a processing unit, for performing processing on data to generate processed data;
an RF front-end circuit, coupled to the processing unit, for transmitting the processed data; and
a circular digital buffer, coupled between the processing unit and the RF front-end circuit, for buffering the processed data;
wherein data transmitted between the RF front-end circuit and the circular digital buffer is serial data, and data transmitted between the circular digital buffer and the processing unit is parallel data.

18. The data transmitting and processing system of claim 17 wherein a bit rate of the processing unit is 8-bits, 16-bits or 32-bits.

19. The data transmitting and processing system of claim 17 being an RFID data transmitting and processing system.

20. An RFID data transmitting and processing system, comprising:
a processing unit, for performing processing on data to generate processed data;
an RF front-end circuit, coupled to the processing unit, for transmitting the processed data; and
a buffering circuit, coupled between the processing unit and the RF front-end circuit, for buffering the processed data;
wherein data transmitted between the RF front-end circuit and the buffering circuit is serial data, and data transmitted between the buffering circuit and the processing unit is parallel data.

21. The RFID data transmitting and processing system of claim 20 wherein a bit rate of the processing unit is 8-bits, 16-bits or 32-bits.

22. A method of receiving and processing data in a data receiving and processing system, the method comprising:
receiving a stream of serial data;
providing a buffering circuit;
storing the stream of serial data in the buffering circuit, comprising:
selecting the stream of serial data according to a reference clock to generate selected data; and
storing the selected data;
providing a processing unit; and outputting data in the buffering circuit to the processing unit in a form of parallel data.

23. The method of claim 22, wherein the step of storing the stream of serial data in the buffering circuit further comprises:
generating a strobe signal according to the stream of serial data and a reference clock.

24. The method of claim 23 wherein the step of storing the stream of serial data in the buffering circuit further comprises:
setting a flag when the strobe signal is generated;
generating a write address; and
generating a read address;
wherein after the flag is set, the received data will not be written into the storage unit when the write address is equivalent to the read address.

25. The method of claim 22, wherein a bit rate of the processing unit is 8-bits, 16-bits or 32-bits.

26. The method of claim 22, wherein the data receiving and processing system is an RFID data receiving and processing system.

27. A method of receiving and processing data in a data receiving and processing system, the method comprising:
receiving a stream of serial data;
providing a buffering circuit;
storing the stream of serial data in the buffering circuit, comprising:
generating a strobe signal according to the stream of serial data and a reference clock
providing a processing unit; and
outputting data in the buffering circuit to the processing unit in a form of parallel data.

28. The method of claim 27 wherein the step of storing the stream of serial data in the buffering circuit further comprises:
setting a flag when the strobe signal is generated;
generating a write address; and
generating a read address;
wherein after the flag is set, the received data will not be written into the storage unit when the write address is equivalent to the read address.

29. The method of claim 27, wherein a bit rate of the processing unit is 8-bits, 16-bits or 32-bits.

30. The method of claim 27, wherein the data receiving and processing system is an RFID data receiving and processing system.

31. A method of receiving and processing data in an RFID data receiving and processing system, the method comprising:
receiving a stream of serial data;
providing a buffering circuit;
storing the stream of serial data in the buffering circuit;
providing a processing unit; and
outputting data in the buffering circuit to the processing unit in a form of parallel data.

32. The method of claim 31, wherein the step of storing the stream of serial data in the buffering circuit further comprises:
generating a strobe signal according to the stream of serial data and a reference clock
selecting the stream of serial data according to the strobe signal to generate selected data; and
storing the selected data.

33. The method of claim 31 wherein the step of storing the stream of serial data in the buffering circuit further comprises:
generating a strobe signal according to the stream of serial data and a reference clock
setting a flag when the strobe signal is generated;
generating a write address; and
generating a read address;
wherein after the flag is set, the received data will not be written into the storage unit when the write address is equivalent to the read address.

34. The method of claim 31, wherein a bit rate of the processing unit is 8-bits, 16-bits or 32-bits.

* * * * *